July 17, 1962 L. H. HOSBEIN 3,044,125
METHOD OF CO-MOULDING BRICK
Original Filed Feb. 4, 1957 2 Sheets-Sheet 1
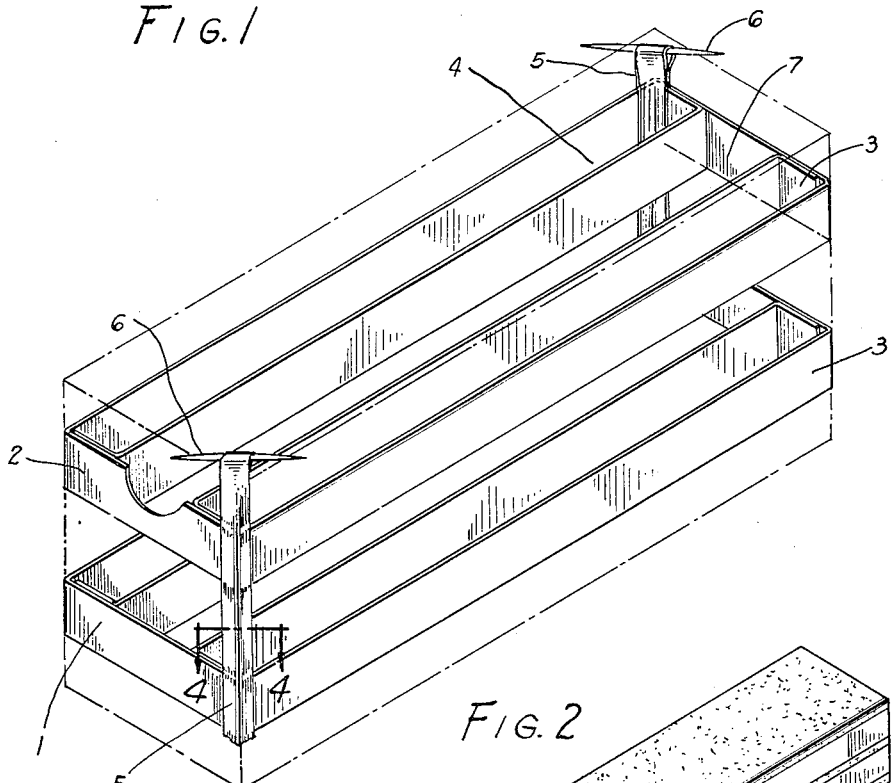
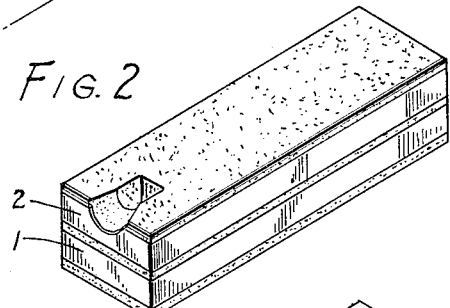
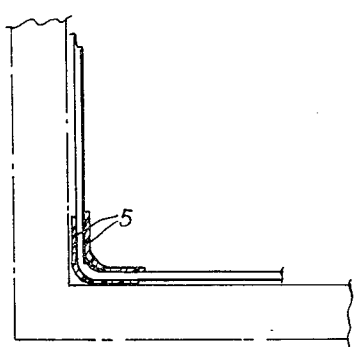
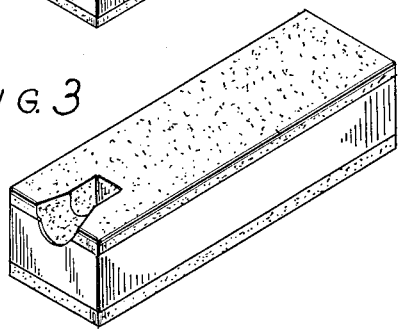
INVENTOR.
Louis H. Hosbein
BY
Zabel, Baker, York, Jones & Dithmar
Attorneys

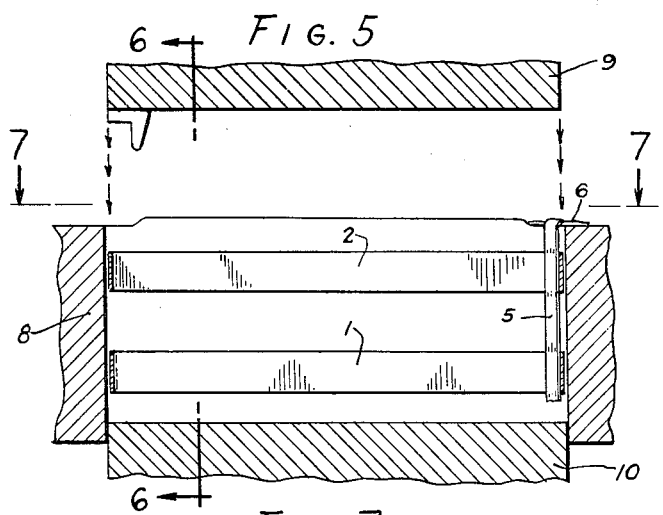
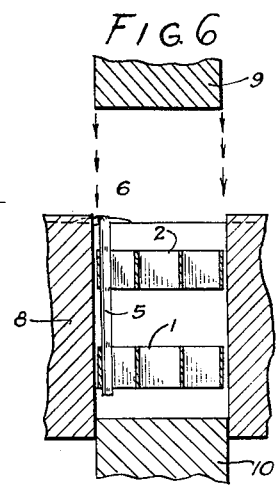
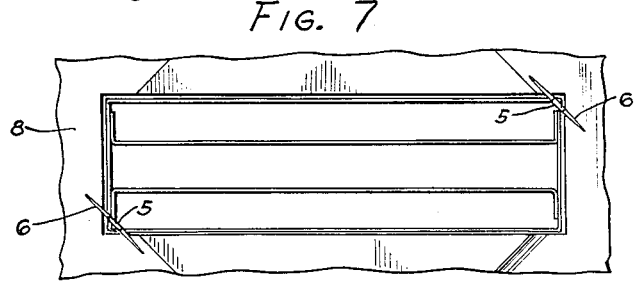
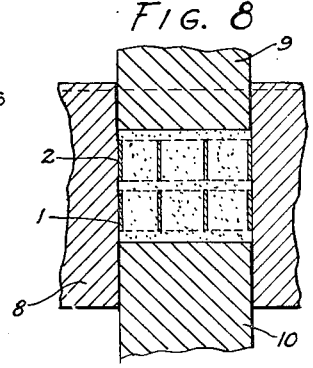
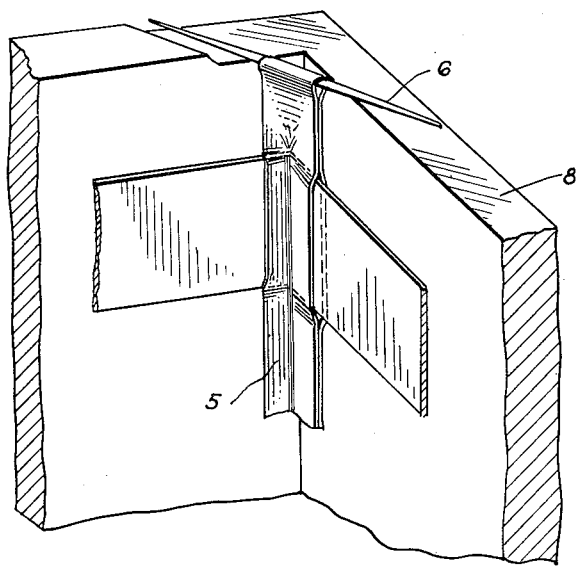

United States Patent Office 3,044,125
Patented July 17, 1962

3,044,125
METHOD OF CO-MOULDING BRICK
Louis H. Hosbein, Glencoe, Ill., assignor to M. H. Detrick Company, Chicago, Ill., a corporation of Delaware
Original application Feb. 4, 1957, Ser. No. 638,148. Divided and this application Aug. 31, 1960, Ser. No. 53,235
4 Claims. (Cl. 18—59)

My invention relates to a method of making co-moulded, refractory brick, and is of particular use in connection with co-moulding refractory material with metallic elements in such a brick, which metallic elements will in the wall, in a known manner, oxidize and attach themselves to the basic refractory material. This application is a division of my application Serial No. 638,148, filed February 4, 1957, now abandoned on Method of Co-moulding Brick, and is a continuation in part of my applications Serial No. 546,462, filed November 14, 1955, now Patent No. 2,975,500 and Serial No. 617,592, filed October 22, 1956, now abandoned.

My invention contemplates novel means for co-moulding such brick in that it permits introduction of a metallic framework into a mould to be supported by the upper edges of said mould, said support being frangible and disrupted during the initial movement of one of the plungers of the said mould.

The framework may then move in coordination with the compression of the refractory material by the two plungers of the said mould whereby the framework is moved as the compression proceeds.

In connection with such co-moulding the general idea is illustrated in my patent applications Serial No. 546,462, filed November 14, 1955, and Serial No. 617,592, filed October 22, 1956.

As well understood, the open mould is filled with refractory material from a filler box which passes over the mould opening, whereupon two plungers are moved towards one another to compress the refractory material into finished brick form.

It is the prime object of my invention to introduce a metallic framework into the mould so that it may be co-moulded with the refractory material. The introduction of this framework into the mould is brought about by having frangible means which support the framework in an initial position, whereupon when said mould is filled with refractory material and the plungers actuated, the framework is no longer supported by the mould but moves in accordance with movement of the refractory material, as it is being compressed.

I will explain my invention more in detail by referring to the accompanying drawings, in which:

FIG. 1 shows in dotted lines the amount of refractory material to be deposited in a mould, together with a metallic framework to be co-moulded therewith, said framework being supported by means engaging the top surface of the mould;

FIG. 2 shows a completed brick in which the refractory material is co-moulded with two sections of framework one above the other;

FIG. 3 shows the same finished brick using but one section of framework;

FIG. 4 is a sectional view on line 4—4 of FIG. 1;

FIG. 5 shows a cross-sectional view of the mould with the means which support the metallic framework in the mould prior to compression;

FIG. 6 is a sectional view on lines 6—6 of FIG. 5;

FIG. 7 is a top view of what is shown in FIG. 5;

FIG. 8 shows the compressed brick with the metallic framework in its final position; and FIG. 9 is a fragmentary view showing more in detail the frangible means which support the framework prior to compression.

Referring more particularly to FIG. 1, I show the metallic framework as consisting of two sections 1 and 2, each section having two rectangular elements 3 and 4 arranged side by side and fastened together by a bridge piece 7. These two sections are supported by two hangers consisting of soft material such as cloth or plastic 5, the top of which is fastened to a supporting element 6. These supporting elements are laid across the top corners of the mould 8 and thus support the two sections in position, as shown in FIG. 1. A more detailed view of the support is shown in FIG. 9. This support 6 is frangible in nature and may consist of a small piece of wood.

It will be seen that when the top plunger 9 of the mould is moved inwardly of the mould that its first action will be to disrupt the frangible element 6 and to permit movement of the two sections of metal as the compression of the refractory material within the mould proceeds by the movement of plungers 9 and 10. It will be understood, of course, that as the framework is being held in position, as shown in FIGS. 1 and 9, refractory material fills the mould right up to the top edge. As the compression proceeds, after the element 6 has been disrupted, the movement of the refractory material tends to move the metallic sections along with it so that they finally occupy a relative position, as shown more clearly in FIG. 8.

FIG. 6 shows the condition of things just before the compresssion begins. After complete compression the brick would appear as shown in FIG. 2. In FIG. 3 I show a completed brick in which I have only one section of metallic ribbon-like material consisting of two side-by-side rectangular elements similar to the arrangement of FIG. 1, except that just one metallic section is utilized instead of two.

From what has thus been described, it will be seen that I have provided a method of co-moulding brick with a metallic framework in such a way that the metallic framework is held in an intermediate or starting position up to the time that the two plungers of the mould begin their function of compressing the refractory material. After disruption of the supporting elements 6 the refractory material is being compressed, at the same time permitting the metallic framework to move into its final resting position which it is supposed to occupy in the finished brick. The two elements of each section of metallic ribbon-like material are fastened together, as more clearly shown in FIG. 1 by the bridge piece 7.

From what has thus been described, the nature of my invention will be readily clear to those skilled in the art and what I claim as new and desire to secure by Letters Patent is as follows:

1. The method of co-moulding basic refractory material with a plurality of ribbon-like metal members to produce a basic brick having said metal members running lengthwise of the completed brick in spaced relation to a pair of side faces of said brick and in spaced parallel relation to each other which comprises holding said metal members in spaced parallel relation to each other and supporting the same in an empty mould cavity of a size larger than the completed brick in a position in spaced relation to the bottom of the mould cavity by disruptable means and with the width of said ribbon-like members extending perpendicularly to the bottom of said mould, filling said mould cavity with the refractory material required for said brick while supporting said metal members by said means in said position with said members held in said parallel spaced relation and moving compressing means into said cavity toward the longitudinal side edges of said ribbon-like members to rupture said supporting means and compress said refractory material into final brick size.

2. The method of making an elongated rectangular refractory brick having longitudinally extending ribbon-like metal members therein in a mould having a pair of fixed opposed side walls and bottom and top walls movable toward each other, comprising supporting said ribbon-like members in said empty mould in a position above the bottom wall of said mould and below the top of the mould cavity by disruptable means and with said ribbon-like members spaced from said opposed side walls and extending parallel to said side walls in spaced relation to each other with the width of said ribbon-like members extending perpendicularly to said movable top and bottom walls of said mould, filling said mould to the top of the mould cavity while supporting said ribbon-like members in said position and moving said top and bottom walls toward each other to rupture said supporting means and compress said refractory material into final brick size.

3. The method of co-moulding basic refractory material with a refractory framework of ribbon-like metal members, consisting of placing said framework in a mould having a cavity deeper than said finished brick and than said framework and having upper and lower plungers with the width of said ribbon-like members extending perpendicularly to the faces of said plungers, supporting said framework in said cavity in spaced relation to said lower plunger by frangible means in the path of at least one of said plungers, filling said mould with comminuted refractory material, and moving said plungers toward each other to compress said refractory material between them into finished brick size, one of said plungers during its compressing movement disrupting the support of said framework by said frangible means.

4. The method of co-moulding basic refractory material with a plurality of ribbon-like metal members to produce a basic brick having said metal members running lengthwise of the completed brick in spaced relation to a pair of side faces of said brick and in spaced parallel relation to each other which comprises holding said metal members in spaced parallel relation to each other and supporting the same in an empty mould cavity of a size larger than the completed brick in a predetermined position in the mould cavity by disruptable means and with the width of said ribbon-like members extending perpendicularly to the bottom of said mould, filling said mould cavity with refractory material for said brick while supporting said metal members by said means in said position with said members held in said parallel spaced relation and moving compressing means into said cavity toward the longitudinal side edges of said ribbon-like members to rupture said supporting means and compress said refractory material into final brick size.

References Cited in the file of this patent

UNITED STATES PATENTS

| | | |
|---|---|---|
| 1,372,387 | Badger | Mar. 22, 1921 |
| 1,727,412 | Roberts | Sept. 10, 1929 |
| 2,652,793 | Heuer et al. | Sept. 22, 1953 |
| 2,901,807 | Helmerson | Sept. 1, 1959 |